United States Patent Office 3,426,737
Patented Feb. 11, 1969

3,426,737
SPARK RETARD CONTROL
Brooks Walker, 1280 Columbus Ave.,
San Francisco, Calif. 94133
Filed Oct. 23, 1965, Ser. No. 503,689
U.S. Cl. 123—97       8 Claims
Int. Cl. F02p 5/06, 5/10, 5/12

ABSTRACT OF THE DISCLOSURE

A device for temporarily retarding the spark timing automatically when the throttle is closed above a preselected engine speed. A valve operated by the throttle mechanism is opened to connect the intake manifold pressure to the retard mechanism. In one form of the invention the intake manifold is opened to atmosphere to render the retard mechanism inoperative. In a second form of the invention the pressure in the intake manifold operates a valve to remove the manifold pressure from the retard mechanism.

---

This invention pertains to improvements in the spark retard control for an engine over the control shown in my U.S. Patent No. 3,162,184, issued Dec. 22, 1964, entitled "Spark Timing Control," and in my U.S. Patent No. 3,195,529, issued July 20 1965, entitled "Auto Smog Control for Spark and Carburetor," which retard the spark (a) when the throttle is closed, (b) after the throttle is closed by the further motion of the throttle control linkage.

This invention cuts out such closed throttle retard at (a) higher engine speeds, (b) when the engine suction is above the engine idle suction range to effect no spark retard when decelerating at higher engine speeds with a closed throttle as this may be disadvantageous and cause muffler or exhaust backfiring, increased unburned hydrocarbons, etc.

Another feature is the use of the mechanism that turns off the fuel to idle or any fuel on high speed decelerations to cut out the spark retard at higher speed retards or when the idle fuel is cut out when decelerating with closed throttle.

Other features of this invention will be more particularly pointed out in the accompanying specification and claims.

I have illustrated my invention in the accompanying drawings, in which.

Figure 1:
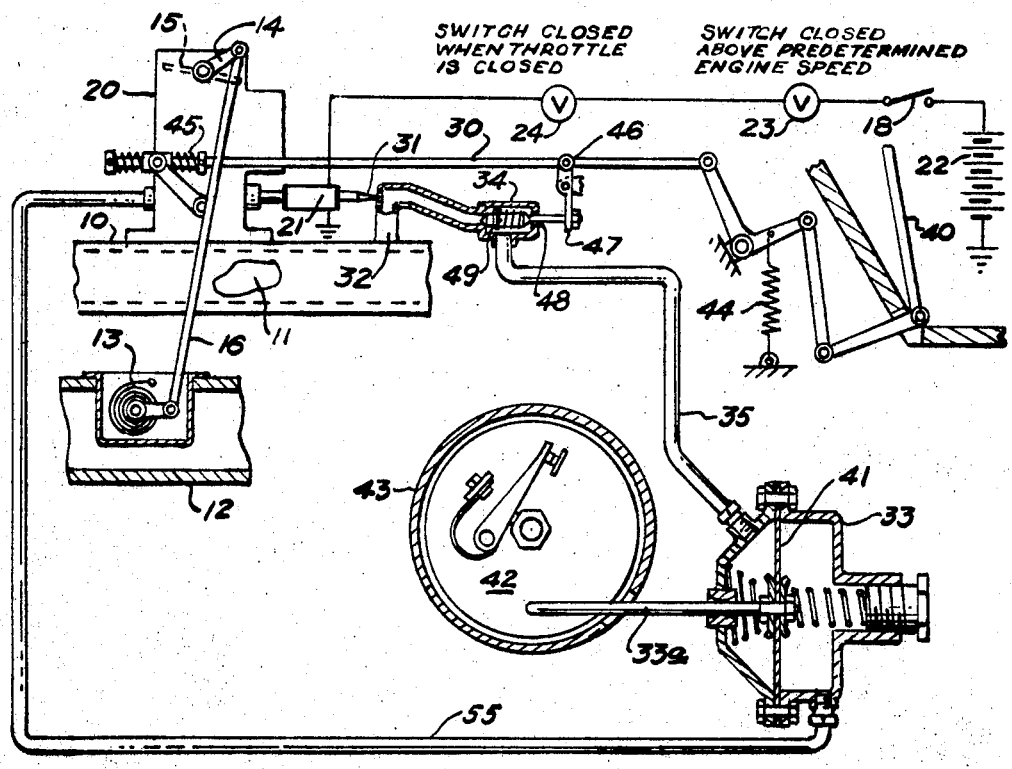
FIG. 1 is a diagrammatic view, partly in section, and partly diagrammatic, showing a spark advance and retard control, forming one form of the invention.

I have shown an engine 10 with an intake manifold 11 and an exhaust manifold 12. A thermostat 13 receives heat from exhaust manifold 12 and transmits motion through rod 16 to choke control arm 14 which operates choke 15 in carburetor 20.

Carburetor 20 has solenoid 21 that can close off the idle fuel in a manner as shown in my U.S. Patent No. 3,162,184, dated Dec. 22, 1964 entitled "Spark Timing Control," or my U.S. Patent No. 3,195,529, dated July 20, 1965, entitled "Auto Smog Control for Spark and Carburetor," both previously referred to.

A circuit to operate the idle fuel shut off includes the battery 22, ignition switch 18, speed sensing switch 23 which is closed above about 1100 r.p.m. plus or minus a series switch 24 which closes when the throttle of carburetor 20 is closed so that solenoid 21 is energized to shut off the idle fuel when the throttle is closed and the engine operating above 1100 r.p.m. plus or minus, such as at a high speed deceleration. Motion from the solenoid 21 is obtained by a rod extending through the solenoid 21 to operate bleed valve 31 which is in line 32 from the intake manifold 11 to distributor plate side of double acting suction controlled spark advance or retard mechanism 33. Throttle linkage controlled valve 34 is opened when the operator's foot is off the throttle 40 to open the circuit from line 32 to line 35 which leads to the retard control side of mechanism 33. Throttle return spring 44 easily overcomes spring 45 to allow stop 46 carried by throttle control rod 30 to hit pivoted lever 47 to open the valve 49 in housing 34 and close the bleed 48. Solenoid controlled bleed valve 31 is open at high speed (above 1100 r.p.m.) decelerations with closed throttle when the idle fuel is turned off and even though valve 34 is open to line 32 there is no suction to operate the retard mechanism 33 and rod 33a at such decelerations. However, when the speed drops below 1100 r.p.m. at closed throttle operation the idle fuel will be turned on and the bleed valve 31 will close. Throttle linkage controlled valve 34 will be open so that suction will be applied through lines 32 and 35 to the lower side of the diaphragm 41 in mechanism 33 to give full retard to the breaker plate 42 of distributor 43 by mechanism as described in my co-pending application Ser. No. 492,498, entitled "Engine Spark Control."

Figure 2:
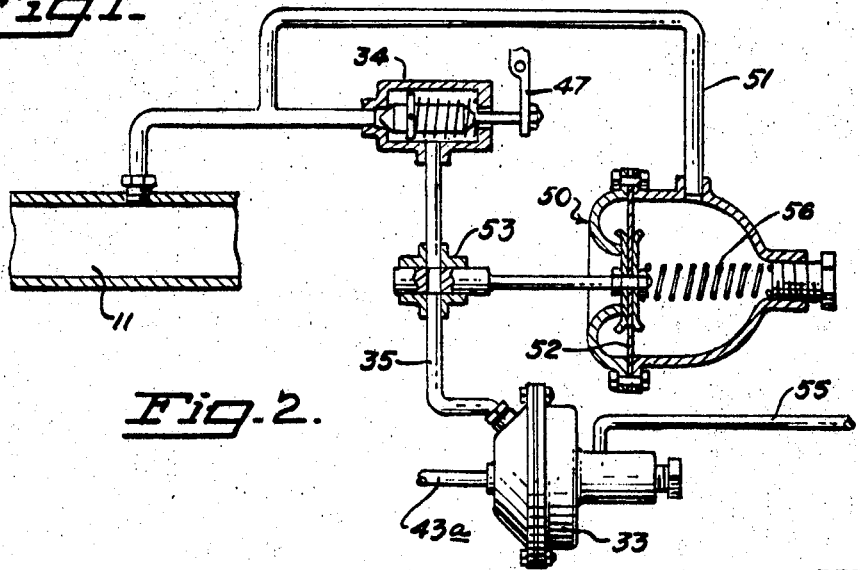
FIG. 2 is a plan view, partly in section, showing another form of the invention.

FIG. 2 shows a high suction diaphragm operated mechanism 50 for cutting out the suction from operating the retard mechanism 33 in place of the solenoid operated bleed valve 31. The spring side of diaphragm 52 is connected by line 51 to intake manifold 11. Spring 56 preloads diaphragm 52 so that valve 53 is closed when the suction in the intake manifold 11 is substantially above idle suction. Such a setting might be above 19″ Hg when idling at 15 to 17″ with the retard as controlled by mechanism 33. In higher speed decelerations when the suction in intake manifold 11 goes above 19″ to 23 or 24″ diaphragm 52 will shut off valve 53 to cut out the retard by mechanism 33. Spring 56 may be adjusted to any other setting that is desired to get the best cut off of the retard when the suction in the intake manifold 11 gets to a higher gage reading than when idling as in closed throttle decelerations above 30 m.p.h. in direct drive. Bleed valves can be used in place of shut off valves and vice versa, so long as the desired results as explained herein are accomplished. The suction controlled advance is supplied by line 55 leading from a port in the carburetor as described in Glenn's Auto Repair Manual, 1962 Edition, page 360, or any other suitable manner.

I have illustrated my inventions in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim as my invention:

1. An engine having a spark distributor, a throttle control mechanism, an engine speed responsive device, a suction controlled advance or retard mechanism, the suction to control the retard being controlled by said throttle control mechanism to turn on engine developed suction to said retard mechanism at engine idle conditions, a second control mechanism for cutting off said engine developed suction to said retard mechanism by said engine speed responsive device so that said retard is effective at engine idle at closed throttle but not at closed throttle operation at much above idle engine speed.

2. An engine having a carburetor, a throttle, a throttle control mechanism, a spark distributor mechanism, an intake manifold, a second mechanism for effecting a spark advance or spark retard connected to said distributor mechanism, a first valve, a second valve, said second mechanism operating said spark advance from suction developed in said intake manifold as controlled by the operation of said carburetor, said second mechanism operating said retard by suction from said intake manifold as controlled by said first valve which is controlled by said throttle control mechanism and by said second valve, said second valve being controlled by suction from the intake manifold so that said retard mechanism operates at closed throttle idle operation but not at suctions substantially above idle intake manifold suctions, such as closed throttle high speed decelerations.

3. An engine having a carburetor, a throttle, a throttle control mechanism, a spark distributor mechanism, an intake manifold, a second mechanism for effecting a spark advance or spark retard connected to said distributor mechanism, a first valve, a second valve, said second mechanism operating said spark advance from suction developed in said intake manifold as controlled by the operation of said carburetor, said second mechanism operating said retard by suction from said intake manifold as controlled by said first valve which is controlled by said throttle control mechanism and by said second valve, an engine speed sensing device operated by said engine, said second valve being operated by said speed sensing device to render said spark retard device inactive by closing off suction to said retard device to obtain no retard at closed throttle higher engine speed decelerations.

4. An engine having a spark distributor mechanism, a second mechanism for retarding the spark from said distributor relative to said engine, a speed sensing device driven by said engine, said speed sensing device rendering said retard mechanism ineffective to retard said spark above a predetermined engine speed.

5. An engine having a spark distributor mechanism, a second mechanism for retarding the spark from said distributor relative to said engine, an intake manifold, a third mechanism for sensing the suction in said intake manifold, said third mechanism rendering said retard mechanism ineffective or no spark retard when said third mechanism senses an intake suction much greater than engine idle suction as measured by a gage.

6. An internal combustion engine having a plurality of cylinders, a carburetor having a throttle and a control linkage therefor, a manifold for conducting a combustible charge from the carburetor to the cylinder, a distributor having a breaker plate for producing a spark in the cylinders, and means for controlling the timing of the spark, said means comprising a housing, a diaphragm connected to the walls of the housing dividing the housing into separate chambers, means connecting the diaphragm to pivot the breaker plate on movement of the diaphragm, and means to move the diaphragm comprising a conduit connected to one of the chambers and a source of suction developed by the engine, a spring in said one chamber for urging the diaphragm in one direction, a second conduit connected to the other chamber, a first valve means connected to the control linkage for connecting said second conduit to the intake manifold or to atmosphere, and a second valve means for controlling the flow of manifold pressure to the other chamber.

7. A device as defined in claim 6 wherein said second valve means comprises an orifice in the wall of the conduit and means for opening and closing said orifice in response to a preselected engine speed and position of throttle.

8. A device as defined in claim 6 wherein said second valve means comprises a valve in the second conduit, a servo motor connected to the valve and the manifold and responsive to the fluid pressure therein for operating the valve to control the flow of fluid in the second conduit.

References Cited

UNITED STATES PATENTS

| 3,014,974 | 12/1961 | McDuffie | 123—117 XR |
| 3,057,938 | 10/1962 | Perry | 123—117 XR |
| 2,455,344 | 11/1948 | Waring | 123—117.1 |
| 2,809,619 | 10/1957 | Norris | 123—117.1 |

WENDELL E. BURNS, *Primary Examiner.*

U.S. Cl. X.R.

123—117